United States Patent [19]

Hashimoto

[11] 4,183,280

[45] Jan. 15, 1980

[54] C-SHAPED RETAINING RING

[75] Inventor: Seiichi Hashimoto, Osaka, Japan

[73] Assignee: Taiyo Hatsujo Mfg. Co., Ltd., Osaka, Japan

[21] Appl. No.: 884,199

[22] Filed: Mar. 7, 1978

[30] Foreign Application Priority Data

Dec. 1, 1977 [JP] Japan .................................. 52-145456

[51] Int. Cl.$^2$ ............................................. F16B 21/00
[52] U.S. Cl. .................................. 85/8.8; 403/DIG. 7
[58] Field of Search .............. 85/8.8; 403/326, DIG. 7

[56] References Cited

U.S. PATENT DOCUMENTS

| | | | |
|---|---|---|---|
| 1,883,899 | 4/1929 | Bluth | 85/8.8 |
| 2,131,948 | 10/1938 | Graham | 85/8.8 |
| 2,416,852 | 3/1947 | Schaaff et al. | 85/8.8 |
| 2,491,306 | 12/1949 | Feltl | 85/8.8 |
| 2,886,382 | 5/1959 | Bavelys | 85/8.8 |
| 2,982,165 | 5/1961 | Wurzel | 85/8.8 |
| 4,006,659 | 2/1977 | Wurzel et al. | 85/8.8 |

FOREIGN PATENT DOCUMENTS

| | | | |
|---|---|---|---|
| 864376 | 1/1941 | France | 85/8.8 |
| 262051 | 6/1949 | Switzerland | 85/8.8 |
| 359836 | 10/1931 | United Kingdom | 85/8.8 |
| 702930 | 1/1954 | United Kingdom | 85/8.8 |

*Primary Examiner*—Thomas J. Holko
*Attorney, Agent, or Firm*—Birch, Stewart, Kolasch, & Birch

[57] ABSTRACT

A C-shaped retaining ring having an open portion and at least two pairs of cutouts formed in the inner peripheral edge or outer peripheral edge of the ring and arranged symmetrically on the opposite sides of the open portion, the ring being uniform in its width and thickness circumferentially thereof. The cutouts are arranged at apexes of an equilateral polygon formed when the ring is loaded as installed on a shaft or in a bore. In addition, the cutouts are separately spaced apart along the peripheral edge of the ring and have a progressively increasing depth toward the open portion. The remaining width of the portion of the ring defining each of the cutouts satisfies the equation:

$$b_n = b \left( \frac{\cos\psi_n + \cos\alpha}{1 + \cos\alpha} \right)^{\frac{1}{2}}$$

where $b_n$ is the remaining width, b is the width of the ring, $\alpha$ is the angle between the center line and the end face of the open portion, and $\Psi$ is the angle between the center line and the cutout.

4 Claims, 7 Drawing Figures

(1) PRIOR ART (2) PRIOR ART

C-SHAPED RETAINING RING

BACKGROUND OF THE INVENTION

The present invention relates to C-shaped retaining rings for shafts or housing bores of various machines and devices, and more particularly to C-shaped retaining rings of the concentric type made by cutting a coiled slender material of rectangular cross section.

Retaining rings are known which are fitted in grooves formed in shafts or bores of various machines and devices to support an axial thrust load against axial displacement. Among such retainings, the ones formed in an overall C-shape can be divided into two general groups: eccentric and concentric.

Usual C-shaped eccentric retaining rings are advantages over C-shaped concentric retaining rings because the former can be free of the fatal drawbacks of the latter such as stress concentration, deformation to a non-circular shape, an increased space required for installation because of such deformation, and a relatively high plastic deformation and flow deformation.

Even with C-shaped eccentric retaining rings, however, it is impossible to expect theoretically perfect circular deformation owing to dimensional and structural limitations. In fact, when installed on a precisely circular shaft or in a precisely circular bore, the ring inevitably involves substantially nonuniform stress or stress concentration although unobvious to the unaided eye.

Such retaining rings for use either on shafts or in bores would function perfectly ideally as intended without involving stress concentration or nonuniform tension if the entire periphery of the ring deflects to a precise circle when the ring is stretched open or compressed at the open portion. This requires that the stress taking place at any portion of the ring be completely equal, but to fulfil this requirement, the inside and outside diameters of the ring must be in coincidence with each other at the cutout ends of the ring; the ring would then have no width at the cutout ends. Such a ring, if any, would be extremely difficult to handle and use, while it is technically very difficult or impossible to shape the ring. Accordingly C-shaped eccentric retaining rings are usually shaped to have a predetermined width at the cutout ends. However, this structure fails to ensure the perfect functioning of the ring as described above.

C-shaped retaining rings have already been proposed which are symmetrically formed with cutouts in the inner or outer peripheral edge of the ring as disclosed in U.S. Pat. Nos. 2,131,948 and No. 2,886,382. The prior art, nevertheless, does not specify nor does it explore the correlation between the cutout in the peripheral edge and the remaining width of the ring where the cutout is formed. Thus the proposed prior art rings still remain to be improved to perfect their functioning.

SUMMARY OF THE INVENTION

An object of this invention is to provide a C-shaped retaining ring having cutouts arranged at apexes of an equilateral polygon to be formed when the ring is loaded, with the apexes inscribed in or circumscribing a circle, even if the entire periphery thereof is not precisely circular, the remaining width of the portion of the ring defining each cutout being so determined that the ring has uniform stress distribution in its entirety to thereby overcome the drawbacks of the conventional C-shaped retaining rings.

Another object of this invention is to provide an improved C-shaped retaining ring which is easy to manufacture with a reduced loss of material.

To fulfil the foregoing objects, this invention provides a C-shaped retaining ring having an open portion and at least two pairs of cutouts formed in the inner peripheral edge or outer peripheral edge of the ring and arranged symmetrically on the opposite sides of the open portion, the ring being uniform in its width and thickness circumferentially thereof, the cutouts being arranged at apexes of an equilateral polygon to be formed when the ring is loaded as installed on a shaft or in a bore, the cutouts being separately spaced apart along the peripheral edge and having a progressively increasing depth toward the open portion, the remaining width of the portion of the ring defining each of the cutouts satisfying the equation:

$$b_n = b \left( \frac{\cos\psi_n + \cos\alpha}{1 + \cos\alpha} \right)^{\frac{1}{2}}$$

where $b_n$ is the remaining width, $b$ is the width of the ring, $\alpha$ is the angle between the center line and the end face of the open portion, and $\Psi$ is the angle between the center line and the cutout.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

With reference to the drawings, embodiments of this invention will be described below in detail.

Figure 1:
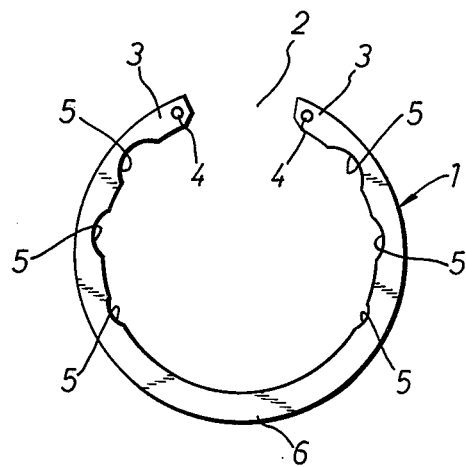
FIG. 1 is a fron view showing a retaining ring of this invention for use in a bore.
Figure 2:
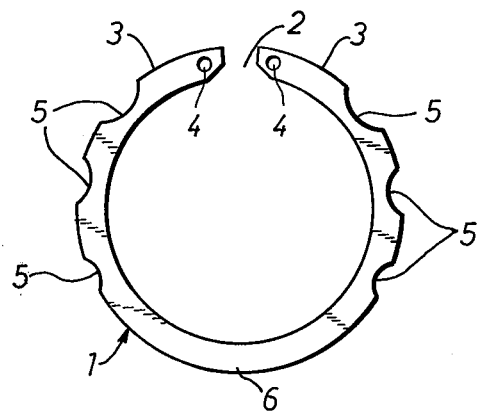
FIG. 2 is a front view of another retaining ring to be used on a shaft.

FIG. 1 shows an improved C-shaped retaining ring of this invention for use in a bore, and FIG. 2 shows a C-shaped retaining ring for use on a shaft. In these drawings, the retaining ring is generally indicated by numeral 1. The retaining ring 1 is made by coiling a slender material of rectangular cross section produced by stretch forming and cutting the coiled material to form an open portion 2. The ring is uniform in width and thickness in the circumferential direction thereof.

The opposed ends 3 of the ring are formed with holes 4 in which a tool is engaged to stretch the ring 1 for installation on a shaft if the ring is adapted for use with the shaft or to compress the ring for installation in a bore if it is so adapted.

When the ring is thus stretched open or compressed at the opposite ends 3, the greatest bending stress acts on a portion 6 opposed to the open portion 2. To ensure uniform distribution of the bending stress, circular arc cutouts 5 are formed by punching in the ring symmetrically on the opposite sides of the open portion 2. When the ring is adapted for use in a bore, the cutouts 5 are formed in the inner peripheral edge of the ring as shown in FIG. 1, whereas if the ring is adapted for use on a shaft, the cutouts 5 are provided in the outer peripheral edge of the ring as seen in FIG. 2. In either case, the cutouts 5 have a progressively increasing depth toward the open portion 2. All the cutouts 5 have the same radius.

According to this invention, the locations where the retaining ring involves an equal stress are positioned in an equi-angular arrangement, and the portions of the ring defining the symmetrical cutouts along the inner or outer periphery of the ring are adapted to have an equal stress as will be described in detail with reference to FIGS. 3 (1) and 3 (2).

In engineering, stress is generally expressed by:

$$\sigma = M/I \quad (1)$$

where:
$\sigma$: bending stress (kg/mm$^2$) occurring at optional point. M: moment of force (kg·mm) at optional point.
I: second moment of area (mm$^4$) at optional point.

Figure 3:
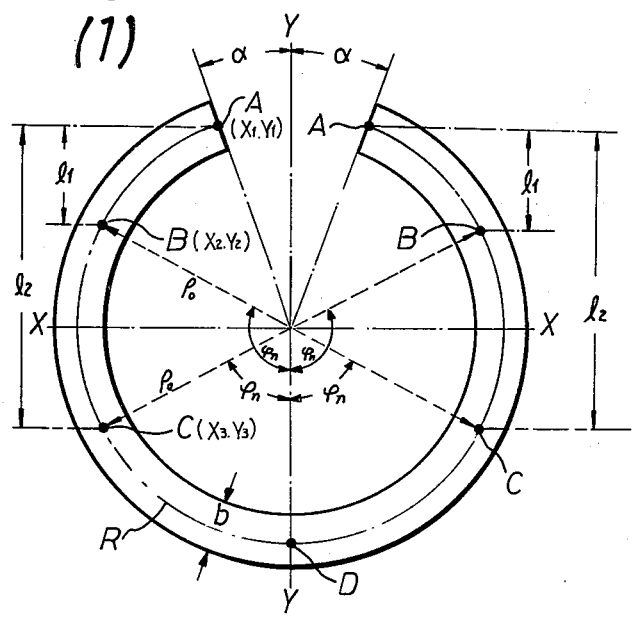
FIGS. 3 (1) and 3 (2) are views illustrating the dimensions and shape of the ring, FIG. 3 (1) is a front view, and FIG. 3 (2) is an enlarged view in section.

With reference to FIGS. 3 (1) and 3 (2), indicated at Y—Y is the central vertical axis of the ring, at X—X the central horizontal axis of the ring, and at R the circular axis at the center of the width of the ring. If the coordinates of point D in FIG. 3 (1) are the origin, and if the coordinates of point A are represented by $x_1$, $y_1$, the coordinates of point B by $x_2$, $y_2$, the coordinates of point C by $x_3$, $y_3$, and if the force acting on point A is P kg, the distance of action of mement between A and B, and between A and C is represented by $l_1$ and $l_2$ mm respectively, and if the radius of the ring is $\rho_o$, the width of the ring is b, and the thickness of the ring is t, then $M_1$ and $M_2$ at points B and C will be:

$$M_1 = P \, l_1 \cdot l_1 = y_1 - y_2 \cdot y_1 = \rho_0 + \rho_0 \cos \alpha \cdot$$
$$y_2 = \rho_0 + \rho_0 \cos(\pi - \Psi_n) = \rho_0 - \rho_0 \cos \Psi_n$$
$$\therefore l_1 = \rho_0 + \rho_0 \cos \alpha - \rho_0 + \rho_0 \cos \Psi_n = \rho_0 (\cos \Psi_n + \cos \alpha)$$
$$\therefore M_1 = P \cdot \rho_0 (\cos \Psi_n + \cos \alpha)$$
$$M_2 = P \, l_2 \cdot l_2 = y_1 - y_3 \cdot y_1 = \rho_0 + \rho_0 \cos \alpha \cdot$$
$$y_3 = \rho_0 - \rho_0 \cos \Psi_n$$
$$\therefore l_2 = \rho_0 + \rho_0 \cos \alpha - \rho_0 + \rho_0 \cos \Psi_n = \rho_0 (\cos \Psi_n + \cos \alpha)$$
$$\therefore M_2 = P \cdot \rho_0 (\cos \Psi_n + \cos \alpha)$$

$M_1$ and $M_2$ can be expressed by the above equations irrespective of the quadrant in which the points B and C exist. Accordingly the moment is given by:

$$M = P \cdot \rho_0 (\cos \Psi_n + \cos \alpha) \quad (2)$$

Since the ring is rectangular in section and the force acts longitudinally of the width b, the second moment of area is expressed by:

$$I = 1/12 \cdot bn^3 \cdot t \quad (3)$$

From Equations (2) and (3), Equation (1) becomes:

$$\sigma_n = \frac{P \cdot \rho_o (\cos \Psi_n + \cos \alpha)}{1/12 \cdot bn^3 \cdot t} \quad (4)$$

Equation (4) defines the stress on the center axis R in FIG. 3. This value is smaller than the stress at the outer or inner periphery of the ring in proportion to the distance of the axis from the periphery, namely to ½ b.

The shape of the ring loaded is dependant on the dynamic state of the location where a great stress occurs; hence the stress at the outer periphery must be considered. Accordingly, $$\sigma_n = \frac{P \cdot \rho_o (\cos \Psi_n + \cos \alpha)}{1/12 \cdot bn^3 \cdot t} \times \frac{1}{2} bn \quad (5)$$
$$= \frac{12 \cdot bn \cdot P \cdot \rho_o (\cos \Psi_n + \cos \alpha)}{2 \cdot bn^3 \cdot t}$$
$$= \frac{6 \cdot P \cdot \rho_o (\cos \Psi_n + \cos \alpha)}{bn^2 \cdot t}$$

Equation (5) shows the relation between the magnitude of stress occurring at an optional point on the outer periphery and the angle $\Psi$ at which the point is positioned.

When this relation is considered with the optional point shifted to the origin 0, $bn = b$ and $\omega_n = 0$ at the origin, hence $\cos \Psi_n = \cos 0 = 1$. Accordingly Equation (5) becomes:

$$\sigma = \frac{6 \cdot P \cdot \rho_o (1 + \cos \alpha)}{b^2 \cdot t} \quad (6)$$

Since equal stress relation must be established when the ring is loaded, Equations (5) and (6) are equal. Therefore, $$\frac{6 \cdot P \cdot \rho_o (\cos \Psi_n + \cos \alpha)}{bn^2 \cdot t} = \frac{6 \cdot P \cdot \rho_o (1 + \cos \alpha)}{b^2 \cdot t}$$

This equation will be simplified to:

$$\frac{\cos \Psi_n + \cos \alpha}{bn^2} = \frac{1 + \cos \alpha}{b^2}$$
$$\therefore bn = b \left( \frac{\cos \Psi_n + \cos \alpha}{1 + \cos \alpha} \right)^{\frac{1}{2}}$$

According to this invention, the C-shaped retaining ring has cutouts arranged at apexes of an equilateral polygon to be formed when the ring is loaded and inscribed in or circumscribing a circle, even if the entire periphery of the ring is not precisely circular, the circle is positionable around a specified shaft or in a desired housing bore with a predetermined clearance provided therebetween. The cutouts are arranged symmetrically and defined by smooth-curved portions whose widths are adapted for uniform stress distribution. Accordingly, the modulus of section can be made proportional to the moment of force at any desired position. This renders the ring installable and removable with a reduced amount of deflection, so that the ring can be handled within a smaller space. Additionally the resulting inhibitory effect on the occurrence of stress renders the material free from objectionable influences and reduces residual plastic deformation, giving improved durability to the ring. The uniform stress distribution achieved enables the ring to exert a uniform gripping force or expanding force, imparting to the ring increased resistance to thrust. The cutouts can be punched by a press machine of reduced capacity. The ring of this invention can be made in improved yield with use of 24 to 18% of the material conventionally required, thus contributing a great deal in savings of the material used.

The cutouts 5 shown in FIGS. 1 and 2 all have the same radius and are defined by a smooth-curved face. The width b of the retaining ring shown is 2.5 times its thickness t. The radius of the cutout is 2.5 times the thickness of the ring.

Figure 4:
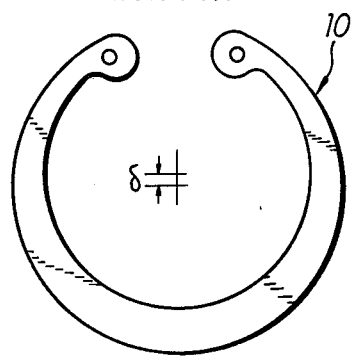
FIG. 4 is a front view showing a conventional eccentric retaining ring.
Figure 5:
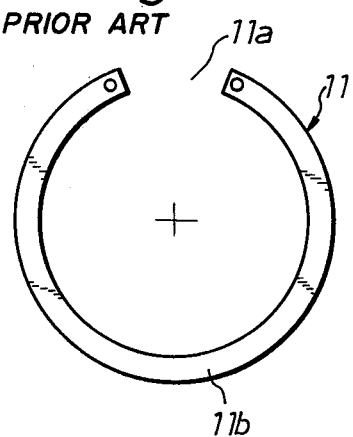
FIG. 5 is a front view showing a conventional concentric retaining ring.

For a better understanding of the features and advantages of this invention, the ring of the invention will be described in comparison with conventional rings. The eccentric C-shaped retaining ring 10 shown in FIG. 4 is made by blanking a plate of the desired thickness and has outer and inner peripheries which are eccentric with each other by δ. However, it is impossible to obtain such a ring accurately in the specified eccentric shape because the blanking operation involves difficulty in ensuring dimensional accuracy. Moreover the manufacturing method affords a low yield and requires a press of large capacity. In contrast, the retaining ring 1 of this invention which is made by cutting a coiled slender material is obtainable in a high yield inexpensively. The concentric C-shaped retaining ring 11 shown in FIG. 5 and is made by cutting a coiled slender material is available in a very high yield but, when the open portion 11a is spread open or compressed, a bending stress will concentrate on the portion 11b opposite to the open portion and marked plastic deformation will result. Consequently the ring is not deformable to a circular form, failing to give as high a gripping force as is exterted by the eccentric retaining ring 10.

Figure 6:
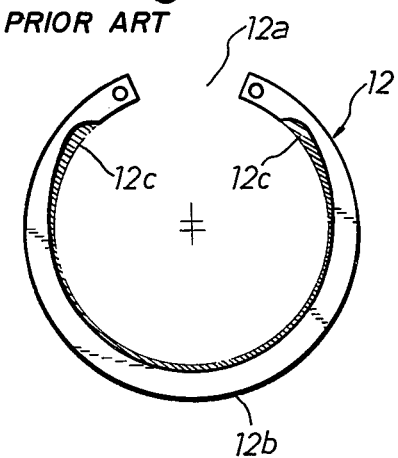
FIG. 6 is a front view of a conventional C-shaped eccentric retaining ring.

The eccentric C-shaped retaining ring 12 shown in FIG. 6 is made by a press work in such a shape that the portion 12b opposed to the open portion 12a is progressively tapered toward the ends, it is difficult to accurately punch the hatched portions 12c from a coiled slender material. Moreover, the portions 12c having a relatively large area must be discarded as scrap, leading to a great loss of the material, and the operation requires a high-capacity press machine. On the other hand, the retaining ring 1 of this invention is formed in its inner or outer peripheral edge with at least two pairs of cutouts 5 arranged symmetrically on the opposite sides of the open portion 2 and having a progressively increasing depth toward the open portion 2. Moreover the cutouts 5 are positioned at the apexes of an equilateral polygon and defined by portions whose widths are adapted for uniform stress distribution. Therefore, the bending stress to be created in the ring 1 can be uniformly distributed, permitting the ring to deform to a substantially circular form and to give a sufficient gripping or pressing force. The construction in which the cutouts 5 are separately spaced apart from each other with the intervening portions allowed to have the original circumferentially uniform width b of the material involves only a greatly reduced loss of the material as compared with the ring of FIG. 6, leading to remarkably improved yield. Moreover, the present ring can be cut out more easily than the ring shown in FIG. 6 in which the portions 12c must be punched, using a much lower pressure on a press of smaller capacity. The symmetric arrangement of the cutouts 5 of the invention serves to simplify the press operation needed, while the circular arc cutouts 5 arranged separately in spaced relation are effective in minimizing the deformation of the ring into a knuckle-like form.

Figure 7:
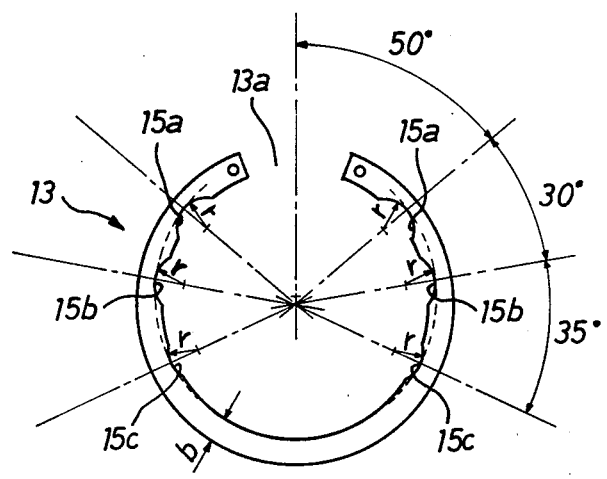
FIG. 7 (1) and (2) are front views respectively showing C-shaped retaining rings already proposed by the present inventor for use on a shaft and in a bore respectively.
Figure 7:
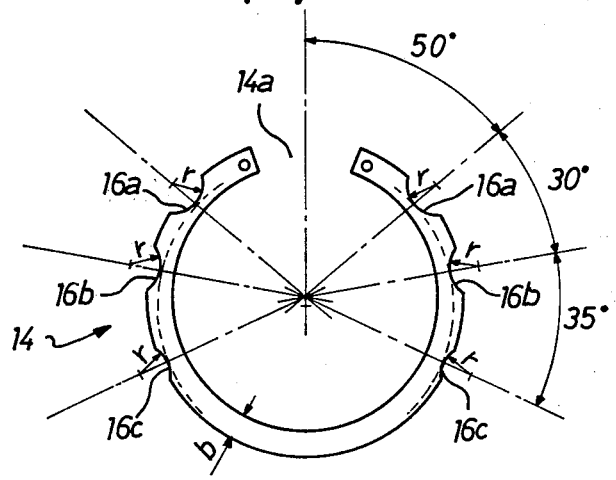

The present inventor has already proposed in Japanese Utility Model Application No. 50-89728 (1975) a C-shaped concentric retaining ring 13 or 14 which is made by coiling a slender material of rectangular cross section and cutting the material. The ring 13 or 14 has a width b and is provided, symmetrically on the opposite sides of an open portion 13a or 14a, with two or more pairs of cutouts 15a, 15b, 15c or 16a, 16b, 16c formed in the inner or outer peripheral edge of the ring. The cutouts 15a to 15c or 16a to 16c have a progressively increasing depth toward the open portion 13a or 14a and are defined by circular arc faces having the same radius r. According to the proposed construction, the cutouts 15a to 15c or 16a to 16c are not arranged equidistantly in the circumferential direction as seen in FIG. 7 (1) or (2), and the remaining width of the portion of the ring defining each cutout is not so adapted that the ring 13 or 14 will have uniform stress distribution in its entirety, since the cutouts are merely adapted to have a progressively increasing depth toward the open portion 13a or 14a. To overcome this disadvantage, the inventor has conducted intensive research and succeeded in the development of the retaining ring 1 described above such that the cutouts 5 can be arranged at apexes of an equilateral polygon to be formed when the ring is loaded as installed on a shaft or in a bore, the remaining width $b_n$ of the portion of the ring defining each of the cutouts 5 being given by:

$$b_n = b \left( \frac{\text{cis } \phi_n + \cos \alpha}{1 + \cos \alpha} \right)^{\frac{1}{2}}$$

With this construction, the retaining ring 1 is adapted for uniform stress distribution in its entirety and, when the open portion 2 is stretched open or compressed, the ring is entirely deformable to a circular form without leaving any clearance between the ring and the surface of the shaft or the surface defining the bore to which the ring is fitted.

What is claimed is:

1. A C-shaped retaining ring comprising:
   an open portion and at least two pairs of cutouts formed in the inner peripheral edge of the ring and arranged symmetrically on the opposite sides of the open portion;
   said ring being uniform in its width and thickness circumferentially thereof and including a portion opposite said open portion without cutouts;
   said cutouts being of a semicircular arcuate shape, having the same radius, and being arranged at selective apexes of an equilateral polygon extending around the entire periphery of said ring and formed when the ring is loaded as installed on a shaft;
   said cutouts being separately spaced an equal distance apart along the peripheral edge and having a progressively increasing depth toward the open portion, the remaining width of the portion of the ring defining each of the cutouts satisfying the equation:

$$bn = b\left(\frac{\cos\psi_n + \cos\alpha}{1 + \cos\alpha}\right)^{\frac{1}{3}}$$

where $b_n$ is the remaining width, b is the width of the ring, $\alpha$ is the angle between the center line and the end face of the open portion, and $\Psi$ is the angle between the center line and the cutout.

2. A C-shaped retaining ring as defined in claim 1 wherein the cutouts have a radius 2.5 times the thickness of the ring, and the width of the ring is 2.5 times the thickness of the ring.

3. A C-shaped retaining ring comprising:
   an open portion and at least two pairs of cutouts formed in the outer peripheral edge of the ring and arranged symmetrically on the opposite sides of the open portion;
   said ring being uniform in its width and thickness circumferentially thereof and including a section opposite said open portion without cutouts;
   said cutouts being of a semicircular arcuate shape, having the same radius, and being arranged at selective apexes of an equilateral polygon extending around the entire periphery of said ring and formed when the ring is loaded as installed in a bore;
   said cutouts being separately spaced an equal distance apart along the peripheral edge and having a progressively increasing depth toward the open portion, the remaining width of the portion of the ring defining each of the cutouts satisfying the equation:

$$bn = b\left(\frac{\cos\psi_n + \cos\alpha}{1 + \cos\alpha}\right)^{\frac{1}{3}}$$

where $b_n$ is the remaining width, b is the width of the ring, $\alpha$ is the angle between the center line and the end face of the open portion, and $\Psi$ is the angle between the center line and the cutout.

4. A C-shaped retaining ring as defined in claim 3, wherein the cutouts have a radius 2.5 times the thickness of the ring, and the width of the ring is 2.5 times the thickness of the ring.

* * * * *